Aug. 25, 1931.  W. J. PEETS  1,820,154
PHONOGRAPH DRIVING MECHANISM
Filed Aug. 15, 1929  3 Sheets-Sheet 1

Witnesses
Geo. Wright
John F. Heine

Inventor
Wilbur J. Peets
By Henry J. Miller
Attorney

Aug. 25, 1931.  W. J. PEETS  1,820,154
PHONOGRAPH DRIVING MECHANISM
Filed Aug. 15, 1929   3 Sheets-Sheet 3

Patented Aug. 25, 1931

1,820,154

UNITED STATES PATENT OFFICE

WILBUR J. PEETS, OF ELIZABETH, NEW JERSEY, ASSIGNOR TO DIEHL MANUFACTURING COMPANY, OF ELIZABETH, NEW JERSEY, A CORPORATION OF NEW JERSEY

PHONOGRAPH DRIVING MECHANISM

Application filed August 15, 1929. Serial No. 386,133.

This invention relates to electric driving mechanism for phonographs and has for an object to provide such a mechanism in which the transmission of magnetic hum, gear noise, vibration and the like, from the motor-mechanism to the sound-record turntable is practically eliminated.

The invention consists in the devices, combinations and relative arrangements of parts hereinafter described and claimed.

Figure 1:
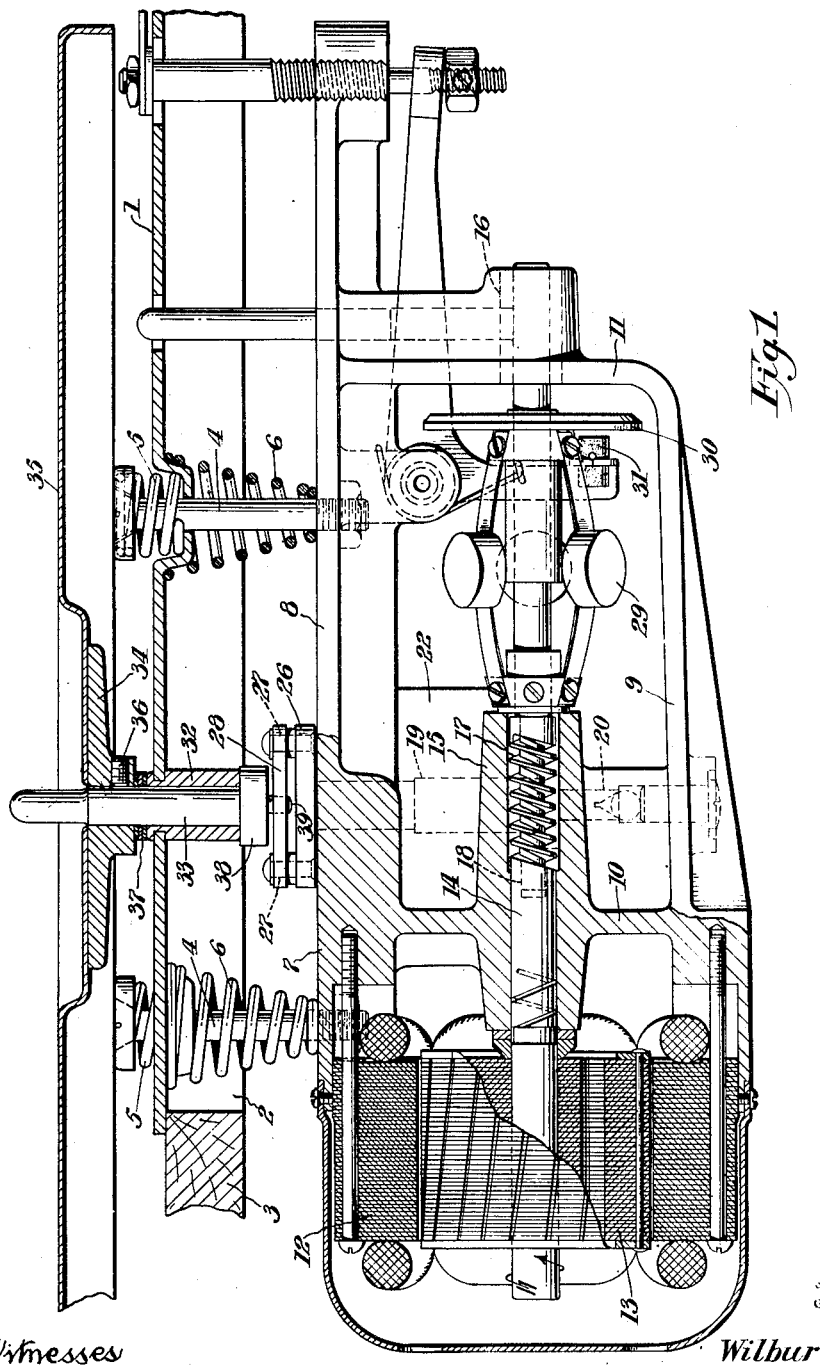
Figure 2:
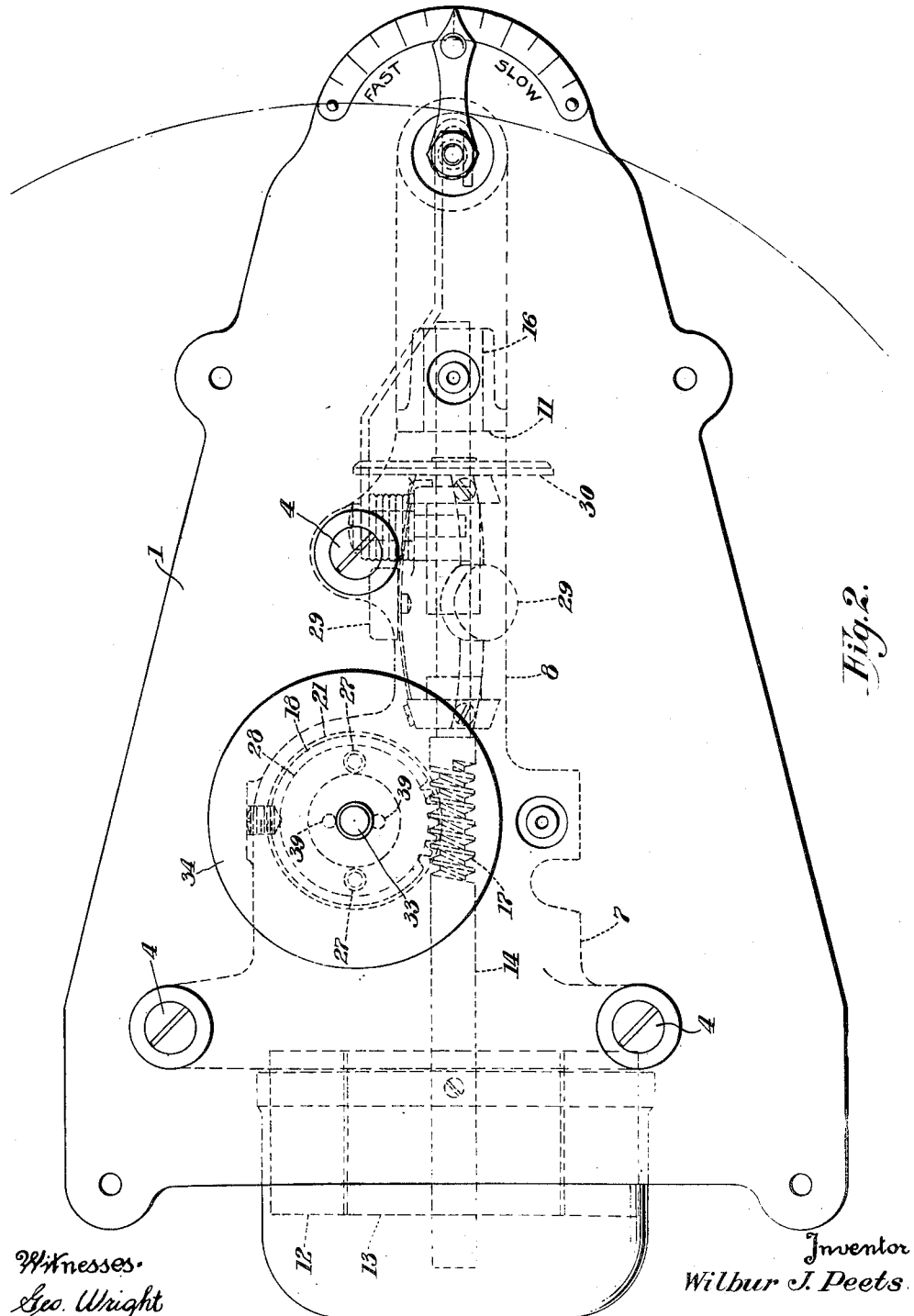
Figure 3:
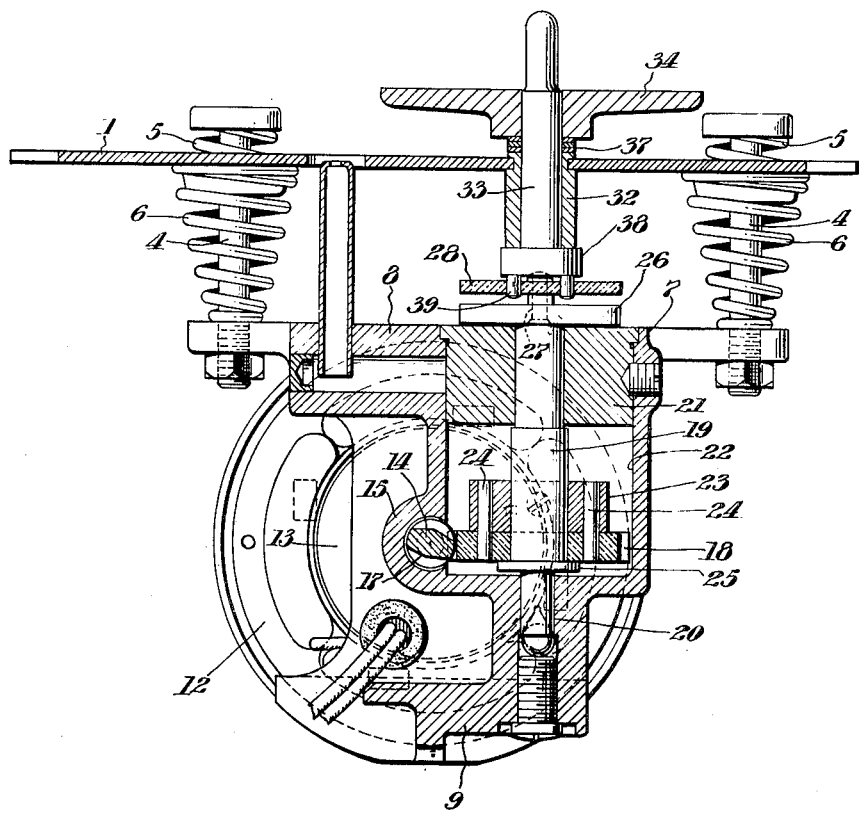

The features of the invention and the advantages attained thereby will be readily understood by those skilled in the art from the following detailed description taken in connection with the accompanying drawings in which Fig. 1 is a longitudinal vertical section of a phonograph-driving mechanism embodying the invention. Fig. 2 is a top plan view, and Fig. 3 is a transverse vertical section of the mechanism.

In the preferred embodiment of the invention illustrated, 1 represents the bedplate of the device which is adapted to be mounted over the opening or cutout 2 in the usual top-board 3 of the phonograph cabinet or carrying case. Suspended from the plate 1 by means of the bolts 4 and springs 5, 6 is the frame 7 of the motor-mechanism which is preferably constructed substantially in accordance with the disclosure of the copending application of H. L. Zabriskie, Serial No. 327,821, filed Dec. 22, 1928. The frame of such motor-mechanism is of skeletonized form having upper and lower horizontal members 8, 9, connected by spaced webs 10, 11. Mounted at one end of the frame-structure is the stator 12 of an alternating current shaded pole induction motor, the rotor 13 of which is mounted on one end of the long shaft 14 journaled in bearings 15, 16 in the webs 10, 11. The shaft 14 is formed with a worm 17 which meshes with a non-metallic gear 18 mounted on and connected to the output spindle 19 which is journaled at its lower end in the ball step-bearing 20 and at its upper end in the plug 21 which closes the upper end of the grease-well 22 in which the gears 17 and 18 run. The spindle 19 has fixed to it a collar 23 having downwardly extending pins 24 entering apertures in the gear 18 which rests upon the flange 25 on the spindle 19. Secured to the upper end of the output spindle 19 is a flange 26 carrying the upwardly extending diametrically opposed headed pins 27 carrying the flexible coupling disk 28 of leather, rubber, or the like. A suitable speed-governor 29 having a centrifugally controlled brake-disk 30 cooperating with the manually adjustable brake-shoe 31 is provided on the motor-shaft 14 between the bearings 15 and 16.

The main supporting plate 1 has riveted thereto the bearing member 32 in which is journaled the spindle 33 to which the hub 34 of the turntable 35 is fixed by means of the set-screw 36. One or more fibre washers 37 fill up the space between the upper end of the bearing 32 and the turntable hub 34 and constitute a step-bearing for sustaining the weight of the spindle 33 and turntable 35 independently of the motor-mechanism spindle 19.

The spindle 33, which is substantially in axial alinement with the spindle 19, is formed at its lower end with a flange 38 from the under face of which project downwardly the diametrically opposed pins 39 entering apertures in the flexible coupling disk 28.

The universal coupling device between the spindles 19 and 33 is of such a nature as to effectively prevent the transmission of magnetic hum from the motor or gear noise, or vibration of any sort through the motor output spindle 19 to the turntable spindle 33. The device is thus particularly well adapted for driving a sound record in connection with an electric pick-up for the reproduction of sound through an electrical amplifying system.

The mounting of the turntable spindle in a bearing rigid with the supporting bed in combination with a yieldingly suspended motor is of advantage that the turntable is maintained in a stable fixed horizontal position at all times regardless of pressure applied to the rim of the turntable, while the motor may vibrate without danger of transmission of such vibration to the turntable.

It will be noted that the diametral distance between the driven pins 39 is less than that between the driving pins 27, and that the diameter of the driven flange 38 is less than the distance between the heads of the driving pins 27. These features are of advantage in that they permit the thin flexible coupling disk 28 to be fastened to the driving flange 26 by headed pins 27, the heads of which do not interfere with the driven flange 38 because of the smaller diameter of the latter. The construction permits the disks 26, 28, 38 to be arranged with a minimum of spacing between them consistent with the requisite freedom for relative vertical movement under normal operative conditions. The construction also permits a thin flexible coupling disk 28 to be used for compactness without danger of disengagement from the driven pins 39 by a twisting or bending action. If the distance between the driven pins 39 were equal to or greater than the distance between the driving pins 27, there would be danger of disengagement of the thin flexible coupling disk 28 from the headless driven pins 39 due to distortion of the disk 28 under operative stresses.

Having thus set forth the nature of the invention, what I claim herein is:

1. In a phonograph driving device, in combination, a main supporting bed, a motor-mechanism yieldingly suspended as a unit from said bed and having a vertical output spindle, a turntable spindle journaled in and supported by said bed independently of the motor-mechanism, a cushioned driving connection between said spindles, and a sound-record supporting tuntable mounted on said turntable spindle.

2. In a phonograph driving device, in combination, a main supporting bed, a motor-mechanism suspended as a unit from said bed and having a vertical output spindle, a turntable spindle journaled in and supported by said bed independently of the motor-mechanism, a flexible driving connection between said spindles, and a sound-record supporting tuntable mounted on said turntable spindle.

3. In a phonograph driving device, in combination, a main supporting bed, a motor-mechanism yieldingly suspended as a unit from said bed and having a vertical output spindle, a turntable spindle journaled in and supported by said bed independently of the motor-mechanism, a universal joint driving connection between said spindles, and a sound-record supporting turntable mounted on said turntable spindle.

4. A phonograph turntable mechanism having, in combination, a supporting bed, a motor-mechanism spring-suspended from said bed and having a vertical output spindle, a turntable spindle journaled in said bed above and in axial alinement with the spindle of the motor-mechanism, a step-bearing between said turntable spindle and said bed for sustaining the weight of the turntable spindle independently of the motor spindle, and a flexible driving connection between said spindles.

5. A phonograph turntable mechanism having, in combination, a supporting bed, a motor-mechanism spring-suspended from said bed and having a vertical output spindle, a driving flange fixed to said output spindle, headed driving pins fixed to said flange, a thin flexible coupling disk supported by said driving pins, a turntable spindle journaled in said bed above and in axial alinement with the spindle of the motor-mechanism, a driven flange fixed to said turntable spindle, driven pins carried by said driven flange and engaging said coupling disk, the diametral distance between the heads of the driving pins being greater than that between the driven pins and being greater than the diameter of the driven flange.

In testimony whereof, I have signed my name to this specification.

WILBUR J. PEETS.